United States Patent [19]

Hammond

[11] Patent Number: 5,758,337
[45] Date of Patent: May 26, 1998

[54] DATABASE PARTIAL REPLICA GENERATION SYSTEM

[75] Inventor: Bradley Mark Hammond, Bellevue, Wash.

[73] Assignee: Microsoft Corporation, Redmond, Wash.

[21] Appl. No.: 689,352

[22] Filed: Aug. 8, 1996

[51] Int. Cl.⁶ ..................................................... G06F 17/30
[52] U.S. Cl. ..................................... 707/6; 707/3
[58] Field of Search .................. 395/182.02; 364/724.13, 364/724.05, 724.11, 184, 572, 724.16, 724.17, 525; 371/32; 382/261, 270; 707/1, 3, 4, 5, 6; 1/1

[56] References Cited

U.S. PATENT DOCUMENTS

| | | | |
|---|---|---|---|
| 4,482,970 | 11/1984 | Barry | 364/572 |
| 4,885,677 | 12/1989 | Heilman et al. | 364/184 |
| 4,941,191 | 7/1990 | Miller et al. | 364/724.05 |
| 5,109,384 | 4/1992 | Tseung | 371/32 |
| 5,315,539 | 5/1994 | Hawes | 364/724.011 |
| 5,487,023 | 1/1996 | Seckora | 364/724.13 |

*Primary Examiner*—Thomas G. Black
*Assistant Examiner*—Ruay Lian Ho
*Attorney, Agent, or Firm*—Duft, Graziano & Forest, PC

[57] ABSTRACT

A system for creating database partial replicas is provided where the referential integrity of the original database is maintained in the partial replica. Filters are specified to allow a user to select, using boolean logic, which rows of the original database are to be propagated to the partial replica. A row containing the primary key corresponding to a foreign key of a row propagated to the partial replica is also propagated to the partial replica. Also, a filter may be specified to include rows that are part of a relationship between multiple record sources. The result is a partial replica database containing only those records desired by the user but also all the records necessary to maintain the referential integrity of the original database.

26 Claims, 14 Drawing Sheets

FIG. 2

CUSTOMERS — 201

| CustomerID | CompanyName | State |
|---|---|---|
| 2011 | Acme, Inc. | WA |
| 2012 | Smith Corp. | CA |
| 2013 | Jones Ltd. | WA |
| 2014 | Blue Co. | CO |

ORDERS — 301

| OrderID | CustomerID | OrderDate | ShipDate |
|---|---|---|---|
| 2011 | 2011 | 1/2/96 | 2/27/96 |
| 2012 | 2013 | 1/8/96 | 3/15/96 |
| 2013 | 2014 | 1/15/96 | 2/12/96 |
| 2014 | 2013 | 1/23/96 | 4/2/96 |

LINE ITEMS — 401

| ItemID | OrderID | ProductID | Quantity |
|---|---|---|---|
| 2031 | 3021 | 2041 | 3 |
| 2032 | 3021 | 2043 | 1 |
| 2034 | 3022 | 2043 | 2 |
| 2035 | 3023 | 2042 | 1 |
| 2036 | 3024 | 2041 | 2 |
| 2037 | 3024 | 2042 | 3 |

PRODUCTS — 501

| ProductID | ProductName | UnitPrice |
|---|---|---|
| 2041 | Widget A | $1.50 |
| 2042 | Widget B | $ .75 |
| 2043 | Widget C | $5.00 |

(502, 503, 504 / 505, 506, 507)

| | Table | Primary Key | Foreign Key | Relationship Name |
|---|---|---|---|---|
| 701 | Products (501) | ProductID (505) | (none) | (none) |
| 702 | Customers (201) | CustomerID (206) | (none) | (none) |
| 703 | Orders (301) | OrderID (306) | CustomerID (307) | Ord Cust (611) |
| 704 | Line Items (401) | ItemID (408) | ProductID (410) | Ord Prod (612) |
| 705 | Line Items (401) | ItemID (408) | OrderID (409) | Ord Details (613) |
|  | 706 | 707 | 708 | 709 |

*FIG. 7*

| | Table ID | Row ID |
|---|---|---|
| 1301 | 201 | 202 |
| 1302 | 401 | 402 |
| 1303 | 401 | 403 |
| 1304 | 201 | 205 |
| 1305 | 401 | 405 |
|  | 1306 | 1307 |

*FIG. 13*

| Table | Primary Key | Foreign Key | Relationship Name | Filter |
|---|---|---|---|---|
| Products (501) | ProductID (505) | (none) | (none) | (none) |
| Customers (201) | CustomerID (206) | (none) | (none) | (none) |
| Orders (301) | OrderID (306) | CustomerID (307) | Ord Cust (611) | Bool: Ship Date < 3/1/96 |
| Line Items (401) | ItemID (408) | ProductID (410) | Ord Prod (612) | (none) |
| Line Items (401) | ItemID (408) | OrderID (409) | Ord Details (613) | Rel: Ord Details |

FIG. 8

|  | CustomerID | CompanyName | State | 901 |
|---|---|---|---|---|
| 902 | 2011 | Acme, Inc. | WA | |
| 903 | 2014 | Blue Co. | CO | |

*FIG. 9*

|  | OrderID | CustomerID | OrderDate | ShipDate | 1001 |
|---|---|---|---|---|---|
| 1002 | 2021 | 2011 | 1/2/96 | 2/27/96 | |
| 1003 | 2023 | 2014 | 1/15/96 | 2/12/96 | |

*FIG. 10*

|  | ItemID | OrderID | ProductID | Quantity | 1101 |
|---|---|---|---|---|---|
| 1102 | 2031 | 3021 | 2041 | 3 | |
| 1103 | 2032 | 3021 | 2043 | 1 | |
| 1104 | 2035 | 3023 | 2042 | 1 | |

*FIG. 11*

| ProductID | ProductName | UnitPrice | 1201 |
|---|---|---|---|
|  |  |  | |

DATABASE PARTIAL REPLICA GENERATION SYSTEM

FIELD OF THE INVENTION

This invention relates to the field of database management and in particular to a system for generating partial replicas of a database. Filters are applied to the tables of the database to select the desired rows and all related rows such that the referential integrity of the database is maintained at the partial replica.

STATEMENT OF THE PROBLEM

A database is a collection of related data typically stored on a non-volatile memory medium. Data in the database are commonly organized in a two-dimensional row and column form called a table. A database typically includes multiple tables. A table is an object in the database containing zero or more records and at least one field common to each existing or potential record. A record is a row of data in the table. A field is a subdivision of a record to the extent that a column of data in the table represents the same field for each existing or potential record in the table. Each field in a record is identified by a unique field name and a field name remains the same for the same field in each record of the table. Therefore, a specific datum in the table is referenced by identifying a record and a field name. Other objects that contain data in a database include, but are not limited to, queries and views. A query, in terms of an object rather than an action, is an executable database interrogation statement, command, and/or instruction that communicates to the database management system the identity and location of data being extracted from the database. Any individual one of the previously identified objects is referred to as a record source because it is a source of data or records from the database.

A relational database is a common database type. One important characteristic of a relational database is that the data therein is relationally distributed among multiple record sources that are normalized in a manner designed to minimize redundant data in the database, minimize the space required to store data in the database, and maximize data integrity. A normalized database is one where each record source in the database is directly related to at least one other record source in the same database by key fields. A key can be a primary key or a foreign key. A primary key is the one field or combination of fields in a record source that contains unique data for each record in the record source. A foreign key is a field or combination of fields in a record source that is the basis for a direct relation with any other record source's primary key.

A database management system is a control system that supports database features including, but not limited to, storing data on a memory medium, manipulating data, and retrieving data from the memory medium.

Replicating all or part of a database is one type of data manipulation performed by a database management system. The need to replicate a database can arise for a variety of reasons. One reason, in a distributed, or networked, computing environment is that the original copy of the database is located on one storage device but there are multiple users of the database who must each access the database to enter or modify data, or query the database. Users can have a replica of the database resident locally so that local high speed access is assured. The database replica might be a replica of the entire original database (a "full replica") or it might only duplicate one or more record sources of the database ("a partial replica"). Partial replicas are advantageous when, as is usually the case with large databases, each individual user of the database only needs access to a subset of the record sources that make up the full database rather than needing access to the entire database. In this fashion, local storage requirements are minimized and access-speed advantages are achieved. Another application of database replicas is the case of a portable laptop computer which, when used in one's office, is connected to a file system containing the original database. When the laptop computer, however, is disconnected from the office system and is used remotely, the user utilizes the database replica contained on the laptop hard drive. This is another example of the need for partial replicas as the laptop computer may well not have sufficient storage capacity to store a full replica but does provide sufficient storage to store a partial replica containing the portion of the database which is relevant to the individual user.

One problem to be addressed with database replicas, and particularly replicas of relational databases, is synchronizing the replica with the main database. When a user, for example, reconnects their laptop computer to the computer or network on which is resident the original database, the changes made to the partial replica of the database, stored on the user's laptop, need to be propogated to the main database and synchronized with the data of the full database. Likewise, changes made to the original database subsequent to the population of the partial replica must be propagated to the partial replica. This problem is made more complex by relational databases where each record source in the database is directly related to at least one other record source in the same database by key fields, as described above. Therefore, although the partial replica of the database may have contained only a subset of the record sources contained in the full database, synchronization of the replica with the full database requires updating record sources not included in the replica due to the interrelationship of record sources in a relational database. Protocols are built into database management systems to assure that changes made in the database are duplicated in a replication and vice versa.

Existing database management systems that support replication features for relational databases only allow replications of the entire database or the entirety of one or more record sources. In order for the user to create, through a query, a partial replica providing the data required by the user as well as 'related' data, the user has to construct a complicated query/sub-query structure and do so with knowledge of the database structure. Therefore, the referential integrity of the original database is not duplicated in the partial replica unless the user has sufficient knowledge of the database structure to allow the user to simulate the relevant referential constraints of the original database.

There exists a need for a database partial replication system that allows a user to define the records of one or more record sources to be included in the replica. There further exists a need for a database partial replication system that automatically maintains the referential integrity of the original database within the partial replica.

STATEMENT OF THE SOLUTION

The above identified problems, and others, are solved and a technical advance achieved in the field by the partial replication system of the present invention. The partial replica filters of the present invention provide methods and associated structure for specifying and applying a filter to the populating of a record source in a replica database. In this way, the partial replica contains only the data specified by the user and still enforces the referential integrity of the original database by including all rows in a record source which are referenced by rows in a related record source which is being copied to the partial replica.

The population of a partial replica is defined by filters specified by the database designer and/or by the database user. The filter may be one of three types: boolean filter, relationship filter, and all-rows filter. A boolean filter specifies a boolean predicate to be applied to the original record source in order to select rows for copying to the partial replica record source. An all-rows filter is a shorthand boolean predicate which specifies simply that the partial replica record source is to contain all records of the original record source. A relationship filter specifies that all rows in a record source which correspond to a row in a related record source that belongs at the partial replica are to be copied to the replica record source. As the database management system applies a relationship filter to the rows of a record source, the management system compiles, in a temporary table, a list of record source and row identifiers for each row that is determined to belong at the partial replica due to a relationship. The database management system then duplicates to the partial replica each row identified in the temporary table, again keeping track of record source and row identifiers for any rows in record sources that participate in a relationship specified by a relationship filter or are necessary to maintain the referential integrity of the partial replica.

The partial replica is populated, in the above-described fashion, with all the rows specified by the filters applied by the user as well as all the rows that are related to those rows and are necessary to maintain the referential integrity of the partial replica. The user is thereby provided a partial replica of the original database which maintains the referential integrity of the original database.

The same filters associated with each table are used to synchronize the partial replica and the original database at the appropriate time. The synchronization process of the present invention is therefore incremental rather than requiring that the entire database be recomputed with each synchronization event.

BRIEF DESCRIPTION OF THE DRAWINGS

FIGS. 2–5 depict tables of a sample database;

FIG. 7 depicts a schema summary table for the database of FIGS. 2–6;

FIG. 8 depicts a exemplary schema/filter summary table for the database of FIGS. 2–6;

FIGS. 9–12 depict tables of a partial replica of the database of FIGS. 2–5 generated using the methods of the present invention to apply the filters of FIG. 8;

FIG. 13 depicts a temporary table utilized by the methods of the present invention;

DETAILED DESCRIPTION

Figure 1:
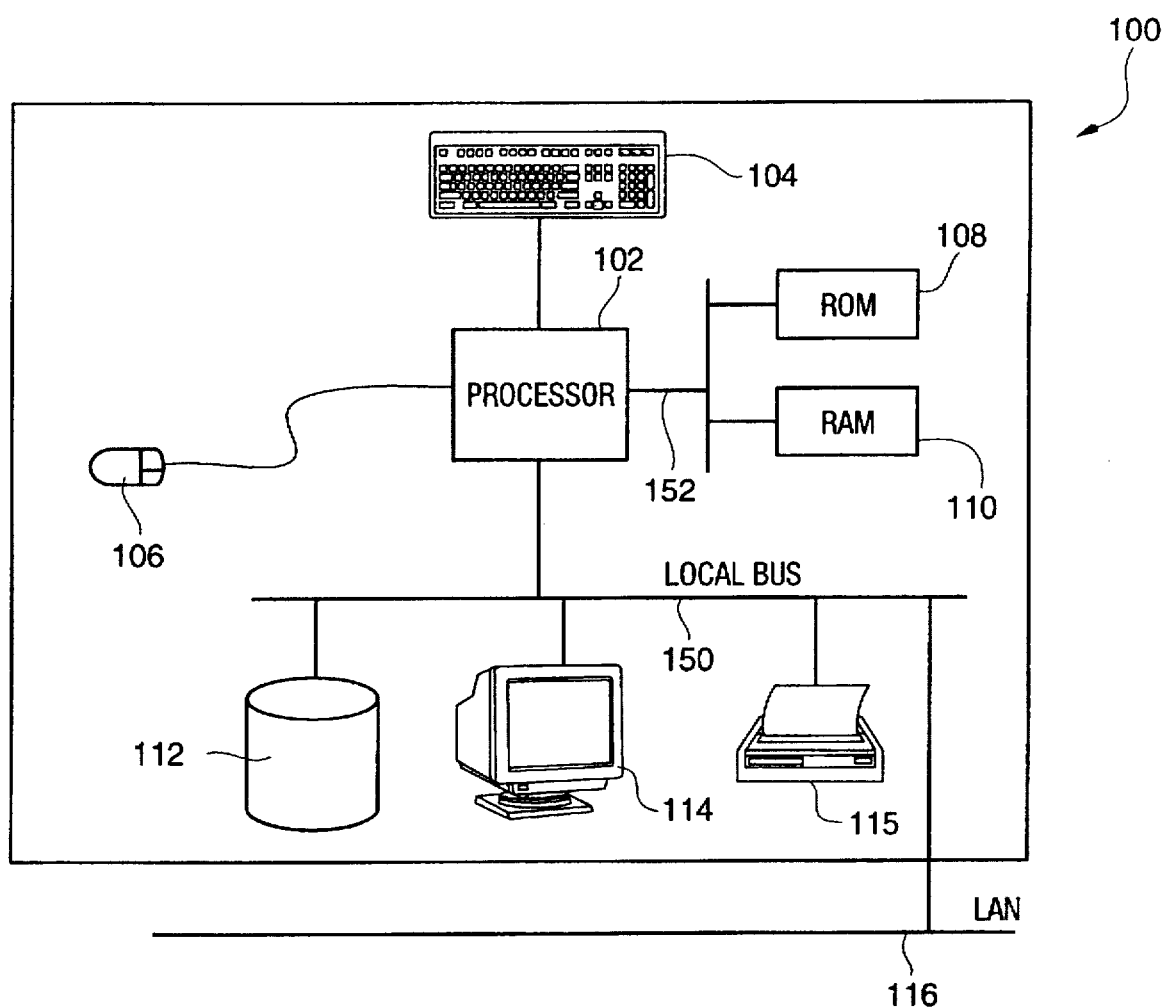
FIG. 1 illustrates a database computing environment in block diagram form.

Database Computing Environment—FIG. 1

FIG. 1 illustrates a block diagram of a computer system 100 in a database computing environment. The partial replica filter system of the present invention is operable in any of several standard computing systems readily available in the industry. Programmed instructions for the partial replica filter system are executable on processor 102. Processor 102 stores and/or retrieves the programmed instructions and/or data from memory devices that include, but are not limited to, Random Access Memory (RAM) 110 and Read Only Memory (ROM) 108 by way of memory bus 152. Another accessible memory device includes non-volatile memory device 112 by way of local bus 150. Memory device 112 may be at all times connected to processor 102 by way of local bus 150 or may sometimes, as in the case of a portable laptop computer which is disconnected from its desktop connections or docking station, be disconnected from processor 102. Alternatively, there may be multiple memory devices 112 where one memory device 112 is at all times connected to processor 102 and another memory device 112 is connected to processor 102 only when processor 102 is connected to its docking station, for example. User input to computer system 100 is entered by way of keyboard 104 and/or pointing device 106. Human readable output from computer system 100 is viewed on display 114 or in printed "report" form on local printer 115. Alternatively, computer system 100 is accessible for user input and/or generating human readable displays in printed and/or display screen output form by way of Local Area Network (LAN) 116 in a manner well known in distributed computing and computer network art.

Sample Database—FIGS. 2–5

FIGS. 2–5 illustrate exemplary tables of an exemplary database which is used below to describe the methods of the present invention. In each of the tables represented in FIGS. 2–5, each column is labeled at the top to indicate the semantic meaning of values displayed below in the corresponding column. The present invention is described with respect to tables for simplicity but those skilled in the art recognize that the inventive methods are equally applicable to all types of record sources. Each row in each of the tables illustrated in FIGS. 2–5 represents an entry in a database stored within memory device 112 of computing system 100. As depicted in FIGS. 2–5, only a portion of the stored database is shown in order to discuss the operation of the methods of the present invention. One of ordinary skill in the art will readily recognize that the exemplary data shown in FIGS. 2–5, and used below as an example in the description of other Figures, provides a simplified database sample for purposes of describing the methods of the present invention.

FIG. 2 represents CUSTOMERS table 201 having records 202–205. CUSTOMERS table 201 has three columns 206–208. Column 206 contains data identifying each customer, "CustomerID", and is the primary key for table 201. As described above, this means that every row 202–205 contains a unique value in column 206 for CustomerID. Column 207 contains the company name data, "CompanyName" and column 208 contains the state of the customer, "State".

FIG. 3 represents ORDERS table 301 having records 302–305. ORDERS table 301 has four columns 306–309. Column 306, the primary key for table 301, contains the order number, "OrderID", for each record in table 301. Column 307 contains CustomerID data and is a foreign key containing data from the primary key, CustomerID, of table 201. The data of column 308 indicates when a particular order was placed, "OrderDate", and the data of column 309 indicates when a particular order was shipped, "ShipDate".

FIG. 4 represents Line Items table 401 having records 402–407. LineItems table 401 has four columns 408–411. Column 408, the primary key for table 401, contains the item number, "ItemID", for each record in table 401. Column 409 contains OrderID data and is a foreign key containing data from the primary key, OrderID, of table 301. The data of column 410 indicates the product number, "ProductID", and is a foreign key containing data from the primary key, ProductID, of FIG. 5, discussed below. The data of column 411 indicates the ordered quantity of a particular item, "Quantity".

FIG. 5 represents PRODUCTS table 501 having records 502–504. PRODUCTS table 501 has three columns 505–507. Column 505, the primary key for table 501, contains the ProductID, as noted above with respect to FIG. 4. Column 506, indicates the name of a product, "ProductName", and column 507 indicates the price of a product, "UnitPrice".

Figure 6:
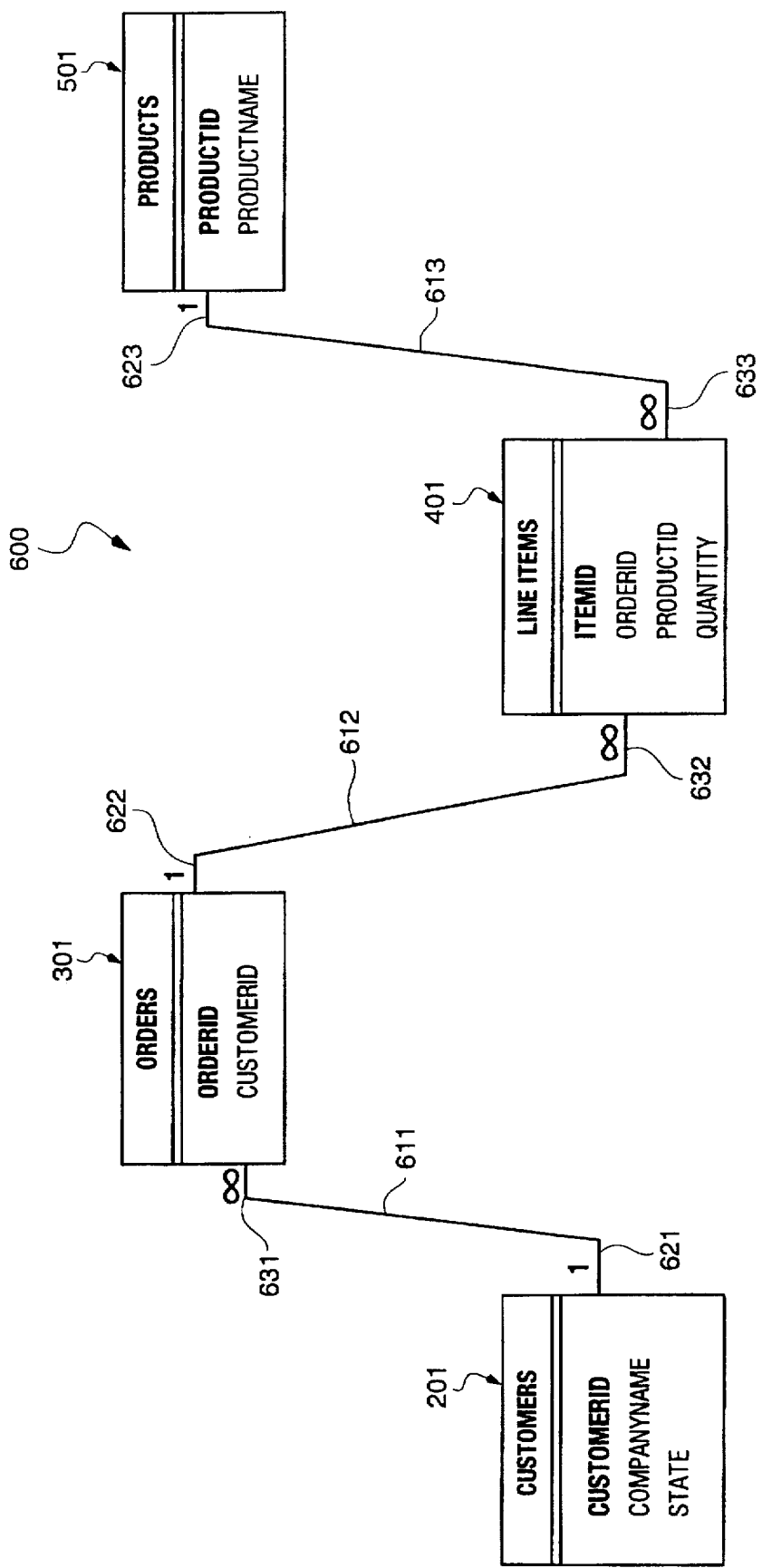
FIG. 6 illustrates a database schema in graphic form for the sample database illustrated by the tables of FIGS. 2–5.

Database Schema FIGS. 6–7

FIG. 6 illustrates a database schema 600 in graphic form with reference to database tables 201, 301, 401 and 501 of FIGS. 2–5 and the relationships 611–613 therebetween. The representations of tables 201, 301, 401 and 501 are simplified with respect to the table representations of FIGS. 2–5 in order to illustrate the relationships 611–613 between tables 201, 301, 401 and 501. Whereas FIGS. 2–5 depict the data within each of tables 201, 301, 401 and 501, database schema 600 lists only the table name and the column, or field, names for each of tables 201, 301, 401 and 501.

Each of the three relationships 611–613 has an originating end 621–623 respectively and a terminating end 631–633 respectively. The three relationships 611–613 each have a 1-to-many cardinality. To simplify the illustration the originating ends 621–623 of each relationship are from primary keys of the respective tables 201, 301 and 501 and the terminating ends 631–633 point to foreign keys of the respective tables 301 and 401. The relationship 611 between CUSTOMERS table 201 and ORDERS table 301 is exemplary of the organization of database schema 600 and of FIG. 6. CustomerID is the primary key for Customers table 201 meaning that there is a unique value stored in the CustomerID column for every row, or record, stored in Customers table 201. Relationship 611 relates the primary key, CustomerID, of Customers table 201 to a foreign key of the same name in Orders table 301. As noted above, the relationships 611–613 have a one to many cardinality therefore, in the example of relationship 611, a particular value of CustomerID will occur in only one record in Customers table 201 but may occur in multiple records of Orders table 301. In particular, for every order placed by a particular customer, a row of data is entered into Orders table 301 and the CustomerID for that customer is included in each row. Relationships 612–413 operate in a similar fashion to that just described with respect to relationship 611.

One important aspect of the partial replica filter system is that the geography of database schema 600 can be referred to in terms of tables and relationships, or in terms of graph theory language of vertices, or nodes, and edges. Regardless of the language used to discuss the geography of a database schema, the terms table, record source, vertex, and node, refer to the same four objects 201, 301, 401 and 501 in database schema 600, the terms relationship, edge, and join, refer to the same three objects 611–613.

FIG. 7 depicts schema summary table 700 having entries 701–705. Summary table 700 summarizes the relationships between tables 201, 301, 401 and 501 of database schema 600. Relationship summary table 700 provides a summary, used below to illustrate the operation of the methods of the present invention, of tables 201, 301, 401 and 501, their primary and foreign keys, and the relationships between tables 201, 301, 401 and 501. The reference numerals associated with the entries in columns 706–709 of schema summary table 700 refer to the corresponding elements of FIGS. 2–6. Column 706 lists the table name while column 707 indicates the primary key for the respective table. Column 708 indicates the foreign key(s), if any for a given table. Note that LineItems table 401 participates in two relationships through two foreign keys, ProductID and OrderID, and is therefore listed twice in schema summary table 700. Each table having a foreign key participating in one of relationships 611–613 has such relationship indicated in schema summary table 700 in column 709.

Methods of the Present Invention: Overview—FIGS. 8–13

FIGS. 8–13 are used to illustrate a simple example of the operation of the methods of the present invention for partial replica filters. The flow charts of FIGS. 14–21 are used below to describe in detail the partial replication generation methods of the present invention.

Schema/filter summary table 800 of FIG. 8 is similar to schema summary table 700 with the exception of the addition of filter column 811. Filter column 811 of schema/filter summary table 800 indicates what type of filter, if any, has been specified for each table of the partial replica. The filters may be specified by the database designer and therefore be transparent to the user or the filters may be specified by the user. The partial replica filter system, as described below in more detail, first creates an "empty"replica of database schema 600 meaning the row and column structure and relationships for tables 201, 301, 401 and 501 are replicated but the tables are emptied of all rows. The system then operates, as described herein, to populate the partial replica with rows as defined by the filters applied to tables 201, 301, 401 and 501 of database schema 600. FIGS. 9–12 depict the partial replica tables 901, 1001, 1101 and 1201 corresponding to the original database tables 201, 301, 401 and 50, respectively, and populated according to the filters specified in table 800.

In the example illustrated in table 800, computer system 100 has been directed to create a partial replica of the database schema 600 wherein the partial replica is to contain the records for all orders, and the related line items, shipped before Mar. 1, 1996. This is expressed in schema/filter summary table 800 by specifying filters 812–813. Filter 812, defined as: "Boolean: ShipDate<Mar. 1, 1996", is to be applied to the records of ORDERS table 301. Filter 813, defined as: "Rel: OrdDetails (313)", is to be applied to the records of LineItems table 401. The operation of these filters is next described.

The system operates on Boolean filter 812 applied to Orders table 301 and copies each row that satisfies the Boolean expression from the original database to the partial replica. Referring again to FIG. 3, row 302, the first row of Orders table 301 satisfies the Boolean expression "ShipDate<Mar. 1, 1996" and row 302 is therefore copied to the corresponding table 1001 in the partial replica illustrated by FIG. 10. The data of row 1002, in FIG. 10, is the data copied from row 302, of FIG. 3, as a result of the operation of filter 812. For each row that is copied to the partial replica, the system of the present invention determines which related rows should also be copied to the partial replica. For each related row that the system of the present invention determines should be copied to the partial replica, the system places a corresponding table and row identifier (an "identifier pair") into a temporary table 1300 depicted in FIG. 13. Since row 302 of Orders table 301 has CustomerID as a foreign key, the corresponding row, row 202, of Customers table 201 should be copied to the partial replica. The system of the present invention places the table identifier, 201, in column 1306 of temporary table 1300 and the row identifier, 202, in column 1307 of temporary table 1200. The identifier pair 1301 is thus placed in temporary table 1200 not because of a specified filter but because it is required in order to maintain the referential integrity of the partial replica.

The system now checks for any relationship filters that might specify additional rows related to the copied row 302 of Orders table 301. Orders table 301 has a primary key, OrderID, that is part of relationship filter 813 specified in FIG. 8 for table LineItems 401. Consequently, all rows in LineItems table 401 having a foreign key corresponding to the copied row 302 of Orders table 301 belong in the partial replica. The system places table and row identifiers in temporary table 1300 for the related rows of LineItems table 401. Those rows, for the current example of copied row 302, are indicated as rows 1302–1303 of temporary table 1300.

This completes the process for the first row of Orders table 301 that satisfies the Boolean expression specified in filter 812. The system iteratively continues with this process through each of the rows of Orders table 301. When the system has iteratively processed all of the rows of Orders table 301, partial replica table 1001 contains rows 1002–1003 and temporary table 1300 contains rows 1301–1305 as indicated in FIG. 13. The partial replica tables illustrated by FIGS. 9, 11 and 12 are still unpopulated at this point in the process of this example. The system then copies each of the original database rows identified in temporary table 1300 to the partial replica tables. For example, row 1301 of temporary table 1300 identifies row 202 of table 201. This row is copied to the corresponding table in the partial replica, table 901, as row 902. When each of the rows identified by rows 1301–1305 has been copied to the partial replica, the corresponding row identifier is removed from temporary table 1300. In this example, the rows identified in temporary table 1300 are not themselves subject to additional relationship filters. However, if the rows identified in temporary table 1300 were subject to relationship filter(s), the system would add a new table and row identifier to temporary table 1300 as appropriate and continue to iterate over temporary table 1300 until all corresponding rows had been copied from original database tables 201, 301, 401 and 501 to partial replica tables 901, 1001, 1101 and 1201, respectively. When each of the rows identified in temporary table 1300 has been copied to partial replica tables 901, 1001, 1101 and 1201, the partial replica is fully populated as depicted in FIGS. 9–12. As illustrated in FIG. 9–12, the fully populated partial replica contains all rows satisfying filter 812 as well as all related rows, meeting the objective of the present invention. "Related rows" means all rows necessary to maintain the referential integrity of the partial replica and all rows specified by a relationship filter, in this case, filter 813. Note that partial replica table 1201 contains no records as none of the records of corresponding original database table 501 are necessary according to filters 812–813.

Figure 18:
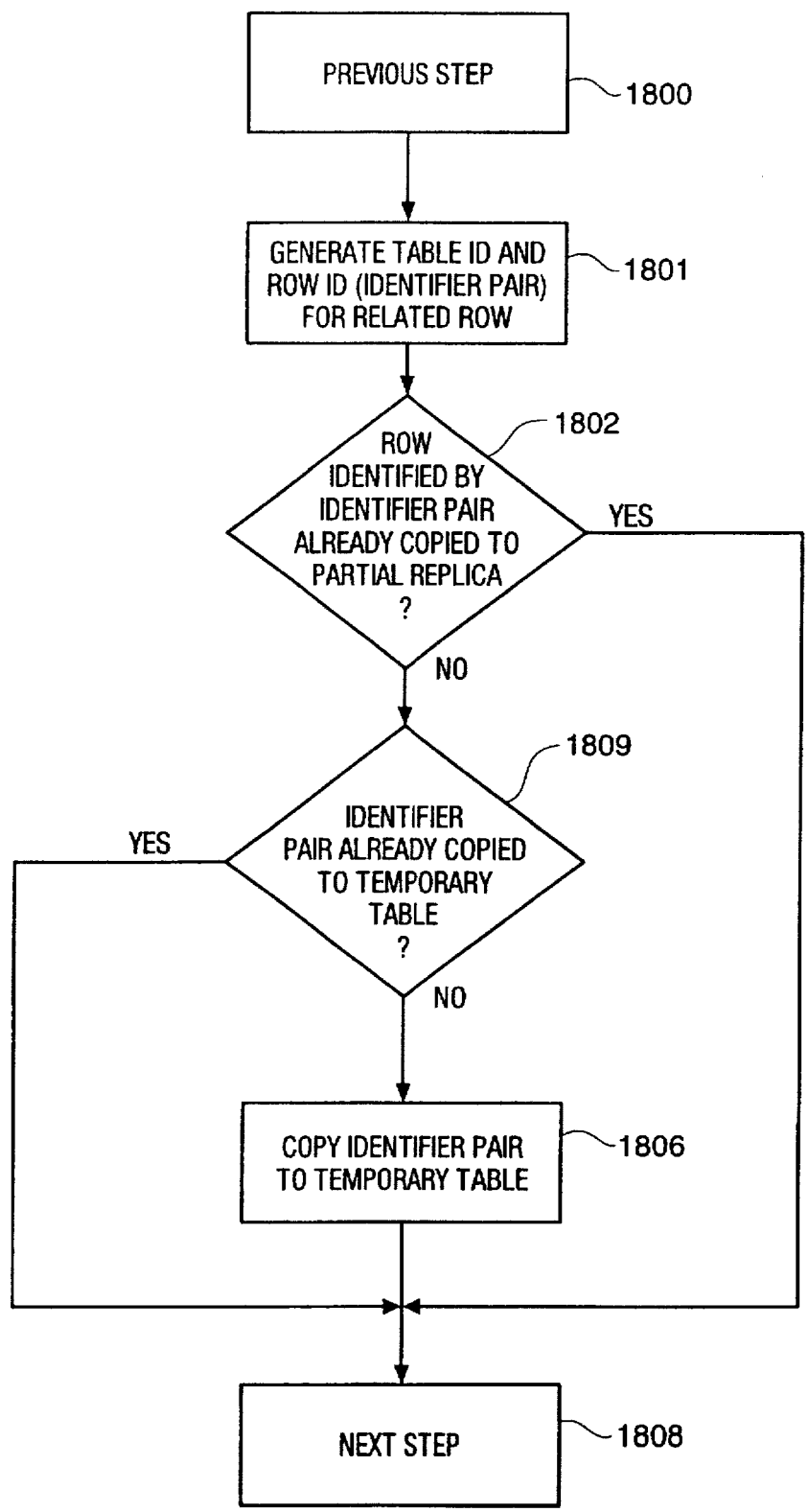

The above description of the example of FIGS. 2–13 is expressed in general terms in order to provide the reader with an understanding of the results of the methods of the present invention. FIGS. 14–18 are flowcharts describing in greater detail the methods of the present invention described above generally with respect to FIGS. 2–13. A flowchart begins on FIG. 14 and continues onto FIGS. 15–17. FIG. 18 is a flowchart which provides additional detail of certain elements of FIGS. 14–17.

Figure 14:
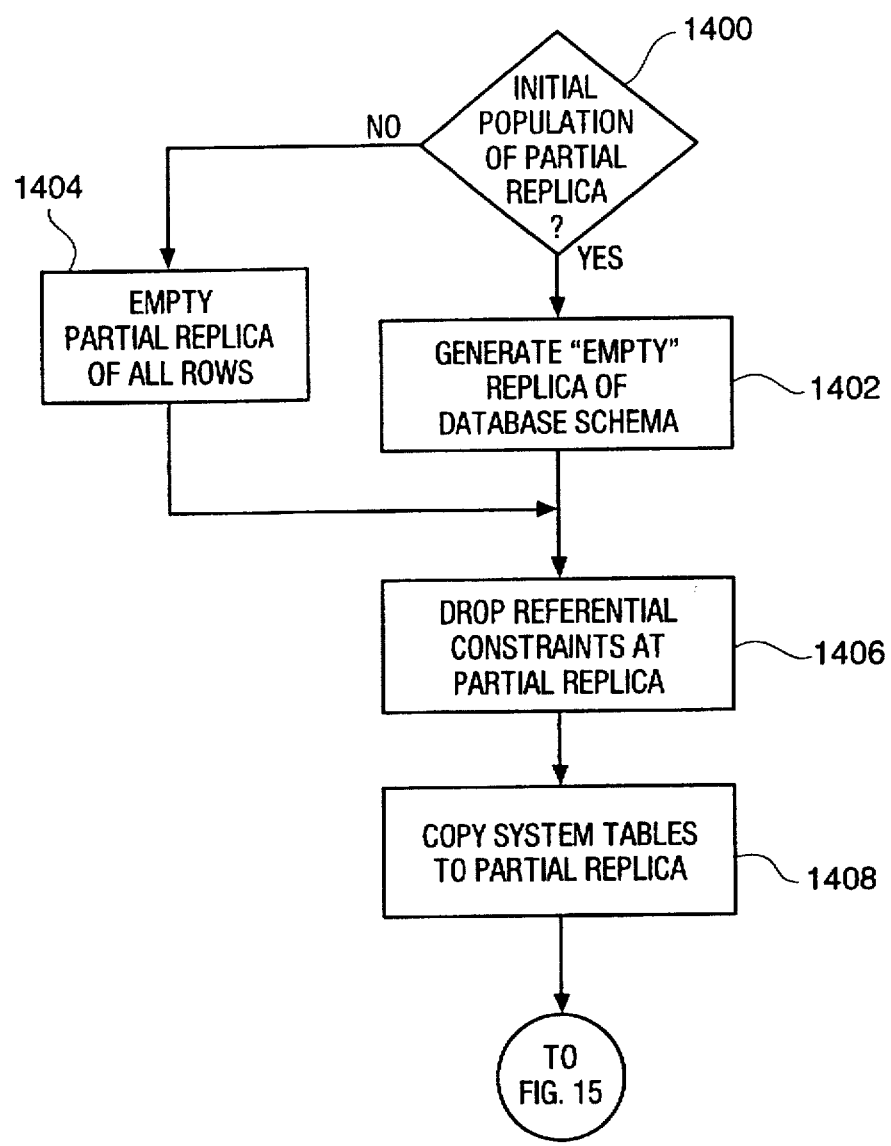
FIGS. 14–18 illustrate the partial replication methods of the present invention in flow diagram form.

Generation of Unpopulated Partial Replica—FIG. 14

Decision block 1400 begins by determining if this request for generating a partial replica of the database is the initial request or whether this is a request to repopulate an existing partial replica. If this is the initial population of the partial replica then processing continues with step 1402. If this is a request to repopulate an existing partial replica then processing continues with step 1404. Step 1402 operates to generate an "empty" partial replica of the database by copying the database schema of the original database. This means that the original database schema, the tables and columns definition, is copied to create the partial replica but without the rows or data of the original database. Step 1404 operates to empty the existing partial replica of all rows, or data. The result of the operation of both steps 1402 and 1404 is an empty partial replica of the original database. Processing continues after both steps 1402 and 1404 with step 1406. In practice, population of a partial replica occurs between a full replica of the original database and a partial replica of the full replica. This is done for a variety of reasons but primarily to protect the integrity of the original database.

Step 1406 operates to drop all referential constraints at the partial replica. As described with respect to FIGS. 6–7, the database schema is defined by the relationships between the tables. Those relationships demand that rows be inserted to the database in a given order since, for example, a row containing a foreign key cannot be input if the row containing the corresponding primary key does not exist. The methods of the present invention require that rows be capable of input to the partial replica in any order. The referential constraints are dropped by operation of step 1406 and will be added back to the partial replica, as described below, when the partial replica is fully populated. Processing then continues with step 1408.

Step 1408 operates to copy certain system tables from the original database to the partial replica. The tables into which a user inputs data are known as user tables. There are certain other tables called system tables that contain administrative information necessary for the operation of the database management system and are not relevant to the methods of the present invention. Processing then continues with step 1410 of FIG. 15.

Population of Partial Replica: All-Rows and Boolean Filters—FIGS. 15–16

Step 1410 operates to select the next table in the database schema for processing by the methods of the present invention. The order in which the tables, and the data therein, are processed is not important. The filters specified for each table define the operation of the subsequent processing elements and each table will be processed in an iterative manner beginning with this step 1410 and ending with step 1436 of FIG. 16. After selecting the next table in the database schema, processing then continues with step 1411. Element 1411 operates to set a variable Final_Table to TRUE if the selected table is the final unprocessed table in the database schema. Processing then continues with decision block 1412.

Decision block 1412 operates to determine if an all-rows filter has been specified for the selected table. If an all-rows filter has been specified for the selected table then processing continues with step 1416 where a variable named All_Rows is set to TRUE. If an all-rows filter has not been specified for the selected table then processing continues with decision block 1414. Decision block 1414 operates to determine if a boolean filter has been specified for the selected table. If no boolean filter has been specified for the selected table then processing returns to step 1410 where the next table is selected. If a boolean filter has been specified then processing continues from decision block 1414 to step 1418.

When processing proceeds to step 1418 it means that a boolean filter or an all-rows filter is specified for the selected table. The methods of the present invention next operate to iterate over each row in the selected table to determine which rows belong at the partial replica. This is accomplished in an iterative process beginning with this step 1418 and concluding with decision block 1434 of FIG. 116. Step 1418 operates to select the next row in the selected table. Processing then proceeds to step 1419 where a variable Final_Row is set to TRUE if the selected row is the final row in the selected table. Processing then continues to decision block 1420.

Decision block 1420 operates to determine if All_Rows is set to TRUE. If All_Rows is set to TRUE then processing continues to step 1424 where step 1424 operates to copy the selected row to the partial replica. If All_Rows is not set to TRUE then processing continues to decision block 1422. Decision block 1422 operates to apply to the selected row the boolean filter specified for the selected table. If the boolean expression evaluates to TRUE for the selected row then processing continues to step 1424 where the selected row is copied to the partial replica. If the Boolean expression does not evaluate to TRUE for the selected row then processing returns to step 1418 where step 1418 operates to select the next row in the selected table. After step 1424 processing continues to decision block 1426 of FIG. 16.

When processing continues to decision block 1426, a row from the database (the "copied row") has been copied to the partial replica by the operation of step 1424. The next set of steps 1426–1432 operate to determine which additional rows, related to the copied row, belong at the partial replica. Decision block 1426 operates to determine if the copied row contains a foreign key. If the copied row contains a foreign key then the row in the database with the corresponding primary key belongs at the partial replica and processing proceeds to step 1428. Step 1428 operates to copy an identifier pair, comprised of a table identifier and a row identifier, for the related row to a temporary table. The identifier pair represents a unique row location within the database and is stored in the temporary table by the operation of step 1428 for subsequent processing. The operation of step 1428 can results in one identifier pair being copied to the temporary table for each foreign key in the selected row. The description of the operation of step 1428 is simplified for this part of this discussion. A more detailed description of the operation of step 1428 is provided with respect to FIG. 18. If the copied row does not contain a foreign key or, alternatively, after the operation of step 1428, processing proceeds to decision block 1430.

Decision block 1430 operates to determine if the primary key of the copied row is part of a relationship specified by a relationship filter for a different table of the database. If so, by operation of step 1432, the identifier pair(s) for all rows with the corresponding foreign key value are copied to the temporary table. The description of the operation of step 1432 is simplified for this part of this discussion. A more detailed description of the operation of step 1432 is provided with respect to FIG. 18. The operation of decision block 1430 can result in more than one identifier pair being copied to the temporary table for a given copied row. In the example of FIGS. 8–13, the identifier pairs 1301–1305 are copied to temporary table 1300 as a result of the operation of steps 1430–1432. Processing then proceeds to element 1434. If it is determined by operation of step 1430 that the primary key of the copied row is not part of a relationship specified by a relationship filter, then processing proceeds directly to decision block 1434.

Figure 15:
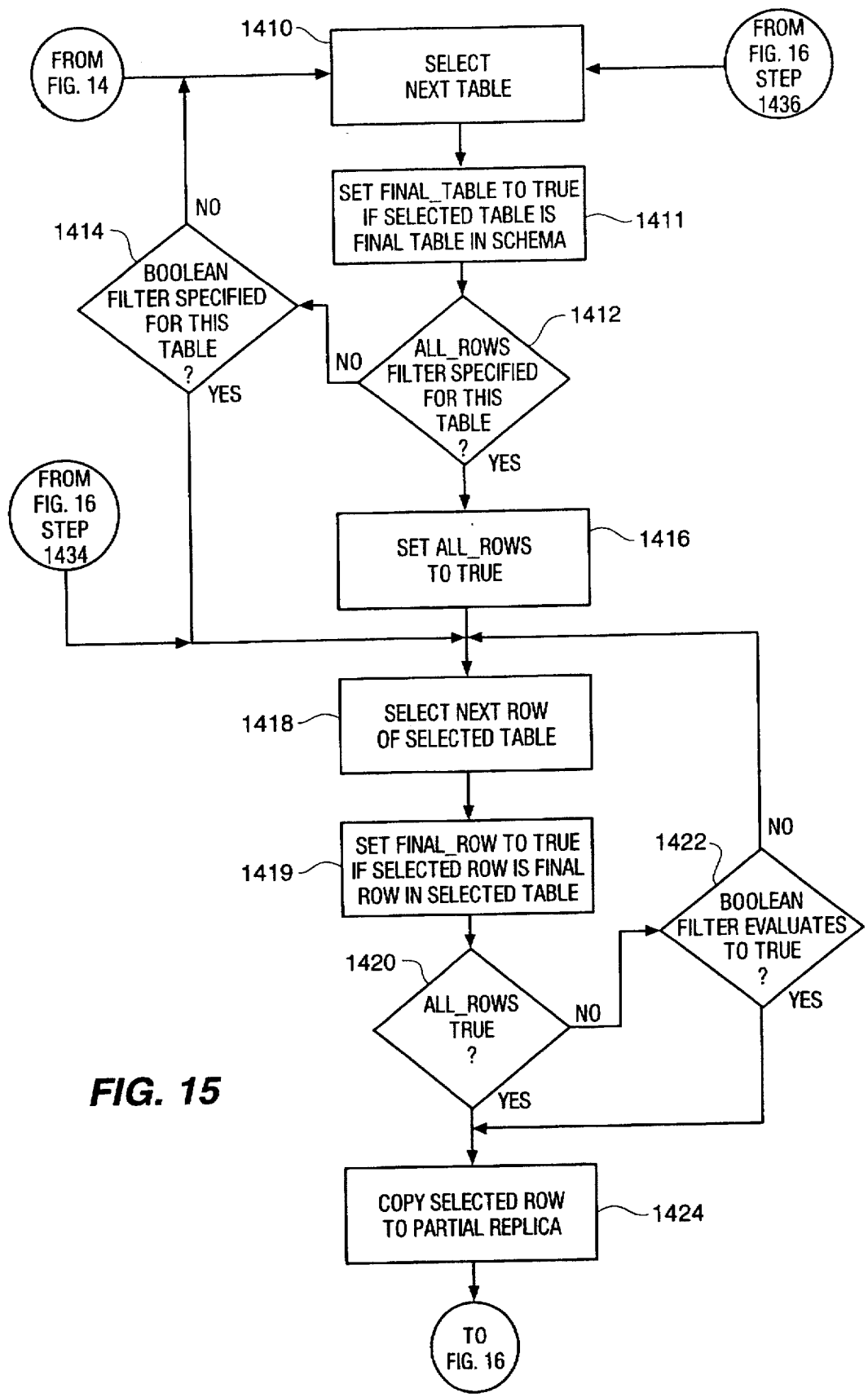

Decision block 1434 operates to continue the iterative process on rows of the selected table if Final_Row is not TRUE by returning processing to step 1418, of FIG. 15, where the next row in the selected table is selected. If Final_Row is TRUE, meaning no more rows remain to be processed in the selected table, then processing continues to decision block 1436. If Final_Table is not TRUE, meaning at least one more table remains to be processed by the present invention, decision block 1436 operates to return processing to step 1410 to select another table. If no unprocessed tables remain then processing continues to decision block 1438 of FIG. 17.

Population of Partial Replica: Relationship Filters—FIG. 11

When operation of the methods of the present invention reaches decision block 1438 all the tables of the database schema have been processed, the appropriate rows satisfying the all-rows and Boolean filters have been copied to the partial replica, and a temporary table containing identifying pairs for related rows has been compiled. The steps 1438–1444 operate to copy the rows identified by the identifier pairs of the temporary table to the partial replica as well as any rows related to those rows identified by the identified pairs that also belong at the partial replica.

Decision block 1438 operates to determine if there are identifier pairs remaining in the temporary table. If there are no more rows of identifier pairs remaining in the temporary table then processing continues to step 1446 where the final operation of the methods of the present invention is, as described below, completed. If there are identifier pairs remaining in the temporary table, processing continues to step 1440.

Step 1440 operates to select the next identifier pair from the temporary table after which processing continues to step 1442 where the related database row defined by the selected identifier pair is copied to the partial replica. Processing then proceeds to step 1444 which operates to delete from the temporary table the identifier pair of the related row just copied to the partial replica. Processing then continues to decision block 1426 of FIG. 16 to begin the process of again determining if there are rows related to the last copied row that belong at the partial replica. For each row, defined by an identifier pair in the temporary table, that is copied to the partial replica, steps 1426–1432 are repeated to identify any related rows. An identifier pair is copied to the temporary table for each related row identified by the operation of steps 1426–1432. The methods of the present invention operate to iterate throughout the temporary table identifier pairs until the temporary table is empty of identifier pairs at which point processing continues to step 1446.

Step 1406 of FIG. 14 operated to drop the referential constraints at the partial replica so that rows from the database could be copied to the partial replica in any order. When processing proceeds to step 1448, the partial replica has been fully populated with data, or rows, but the partial replica is not yet usable as a relational database because their are no defined relationships between the tables of the partial replica. Step 1448 operates to add the referential constraints back to the partial replica so that the referential constraints of the original database are enforced on the partial replica.

Further Detail of the Methods of the Present Invention—FIG. 18

Figure 16:
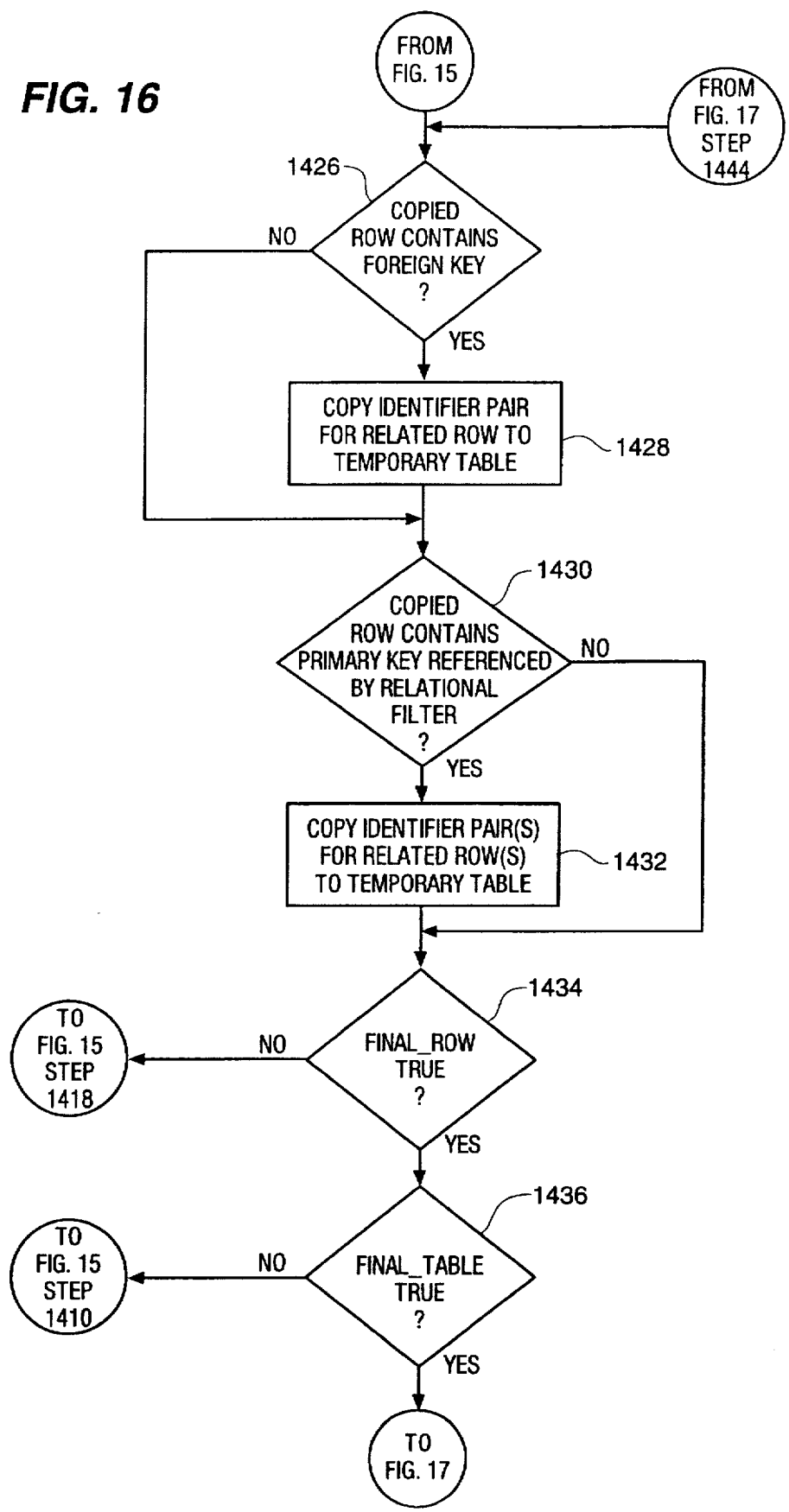
Figure 17:
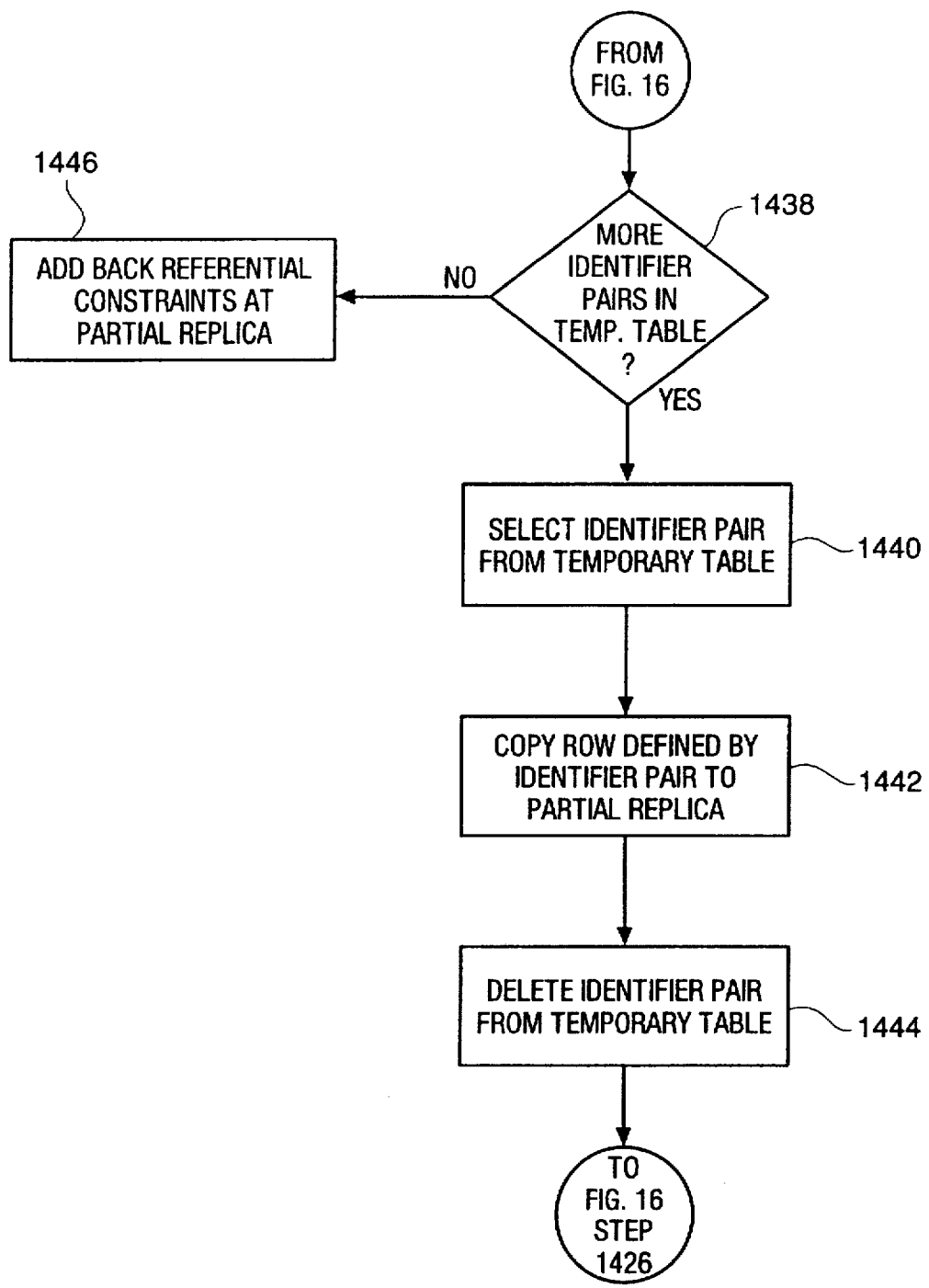

FIG. 18 illustrates further detail for steps 1428 and 1432 of FIG. 16 to ensure avoidance of duplicating rows at the partial replica. These steps 1800–1806 logically replace steps 1428 and 1432 and therefore are processed each time an identifier pair is to be copied to the temporary table.

Step 1800 represents the processing steps preceding the step, or series of steps, where an identifier pair is copied to the temporary table. In the case where steps 1800–1808 are used to replace step 1428 of FIG. 16, step 1426 of FIG. 16 is represented by step 1800 of FIG. 18. In the case where steps 1800–1808 are used to replace step 1432 of FIG. 16, step 1430 of FIG. 16 is represented by step 1800 of FIG. 18.

Step 1801 operates to generate the table identifier and the row identifier (the "identifier pair") for the related row(s). Although there is a unique identifier pair for each related row, there may be multiple rows for which identifier pairs are generated depending on the database schema and specified filters. Processing then proceeds to decision block 1802.

Decision block 1802 operates to determine if the row identified by an identifier pair has already been copied to the partial replica. If it has, then the identifier pair need not be copied to the temporary table and processing continues to the next step 1808 in the process. If the row identified by the identifier pair has not already been copied to the partial replica then processing continues to decision block 1804.

Decision block 1804 operates to determine if the identifier pair has already been copied to the temporary table. If it has, then the identifier pair need not be copied to the temporary table and processing continues to the next step 1808 in the process. If the identifier pair has not yet been copied to the temporary table then processing continues to step 1806 where the identifier pair is copied to the temporary table. After step 1806 processing continues to the next step 1808 in the process. In the case where steps 1800–1808 are used to replace step 1428 of FIG. 16, step 1430 of FIG. 16 is represented by step 1808 of FIG. 18. In the case where steps 1800–1808 are used to replace step 1432 of FIG. 16, step 1434 of FIG. 16 is represented by step 1808 of FIG. 18.

Figure 19:
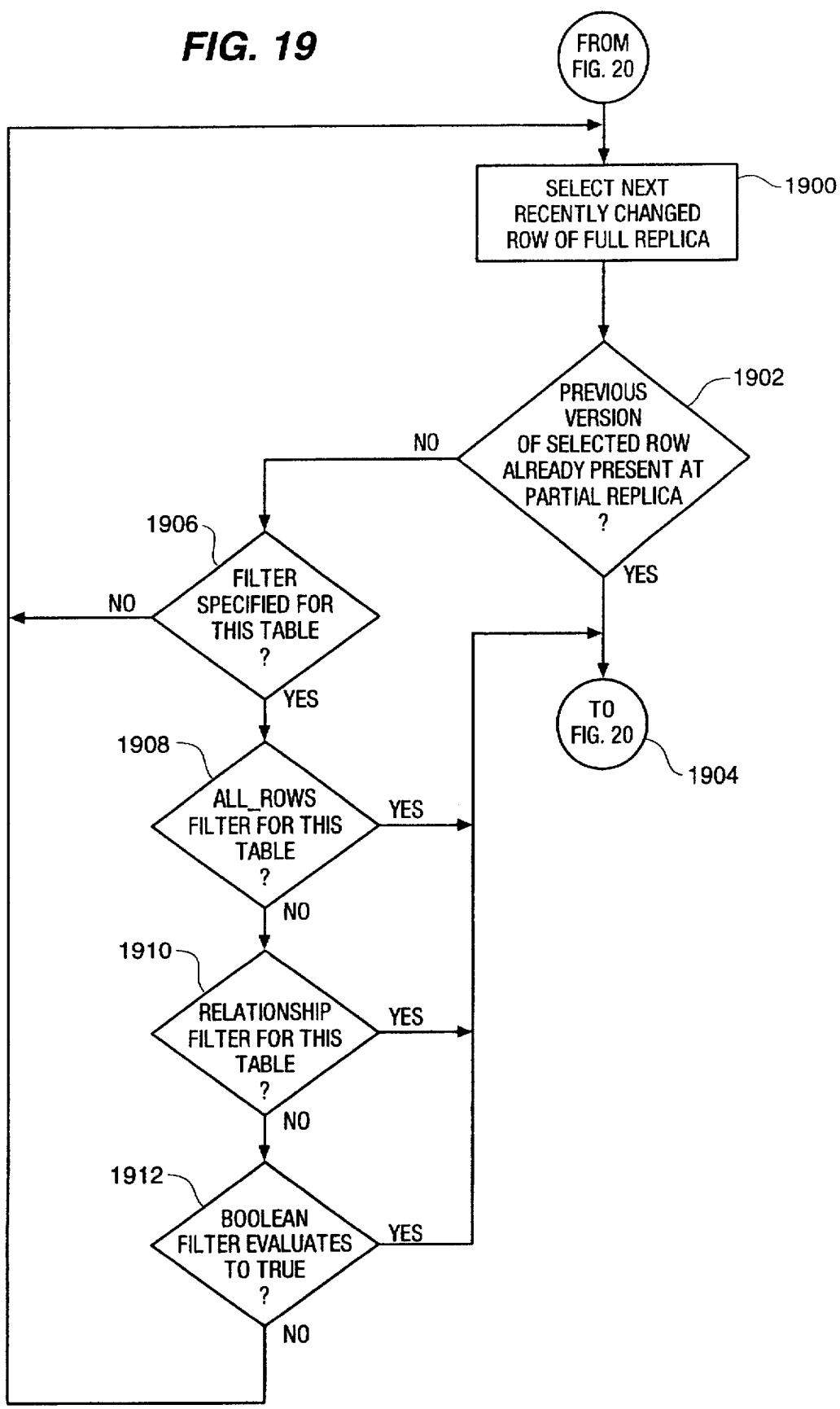
FIGS. 19–21 illustrate the partial replication synchronization methods of the present invention in flow diagram form.
Figure 20:
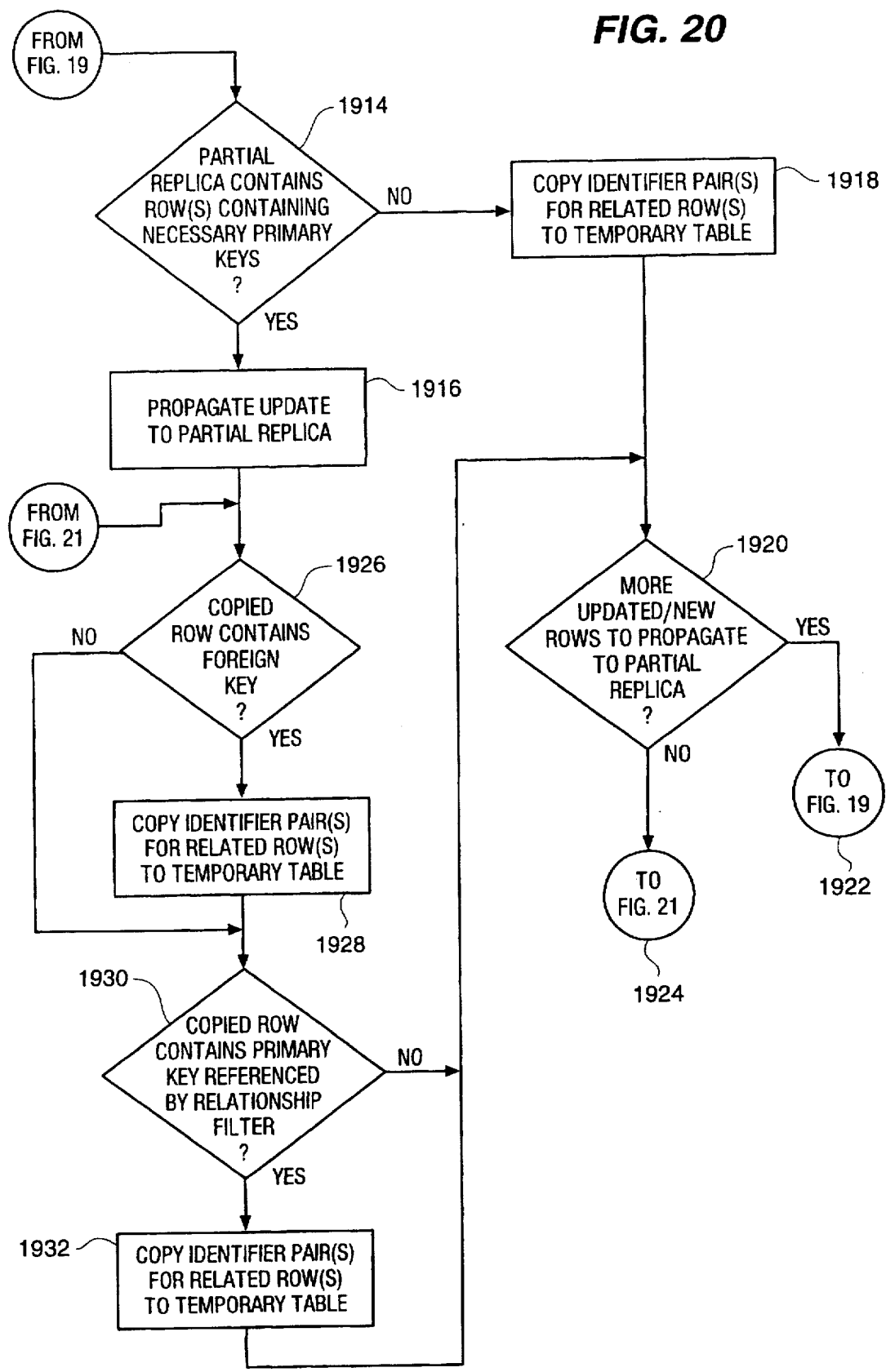
Figure 21:
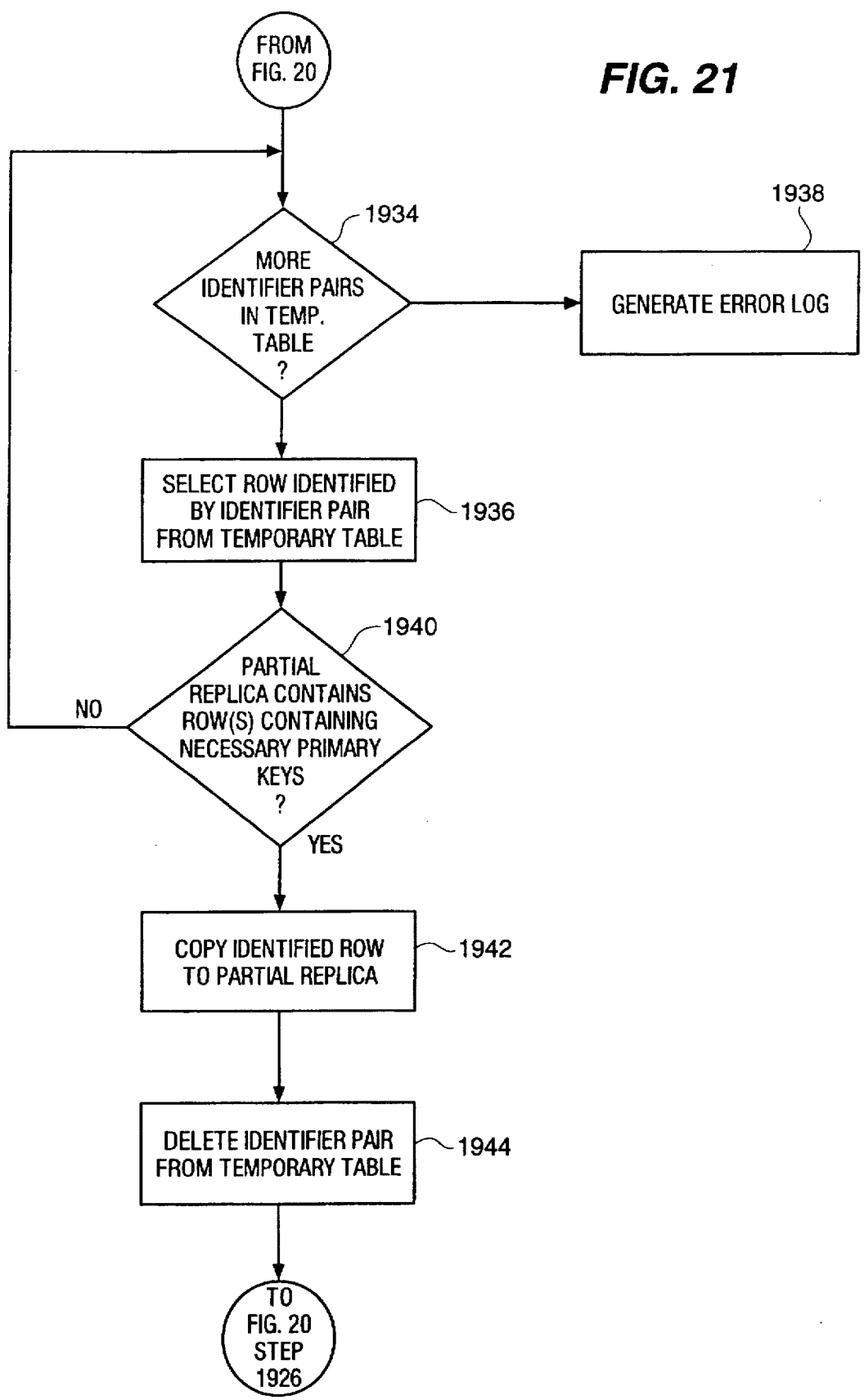

Synchronization of Partial Replica FIGS. 19–21

An important aspect of partial replicas is the need to synchronize the data of the partial replica with the original database. The partial replica represents a subset of the data of the original database. Subsequent to the population of the partial replica, the partial replica can accept new data, or rows, or the existing data may be modified. Likewise, subsequent to the population of the partial replica, the original database can accept new data or the existing data may be modified. When a synchronization is performed, changes made to the original database since the last synchronization must be propagated to the partial replica and changes made to the partial replica since the last synchronization must be propagated to the original database. Synchronization of a replica, whether a partial replica or a full replica, is best performed between two replicas rather than between the replica and the original database. This is done for a variety of reasons but primarily to protect the integrity of the data in the original database. Therefore, the data of the "full replica" referred to in the description of FIGS. 19–21 is the same as the data of the corresponding original database.

Most of the steps required to synchronize a partial replica are the same as prior art methods known for synchronizing two full replicas. However, due to the unique advantages of the methods of the present invention for creation of partial replicas, the present invention provides methods for synchronizing a partial replica of the present invention with the full replica of the original database. As used herein, the phrase, "recently updated row" means a row in the full replica that has been inserted or updated since the last relevant synchronization of the partial replica. Some recently updated rows should not be propagated to the partial replica as they do not meet the specifications of the partial replica as defined by the above-described filters. Also, a recently updated row at the full replica may cause other rows, at the full replica, which were not recently inserted or updated, to now meet the partial replica's specifications. In this case, some rows may have to be inserted into the partial replica from the full replica from the full replica even though they have not recently changed. The following description of FIGS. 19–21 relates to that portion of the synchronization methods unique to the present invention.

As noted above, changes made to the partial replica since the last synchronization are propagated to the full replica according to known methods of the prior art. The remaining methods of the present invention relate only to the propagation of changes from the full replica to the partial replica. A logical clock time-stamp is used to determine which rows have changed since the last synchronization.

Step 1900 operates to select the next recently updated row of the full replica. The order in which the rows of the full replica are selected is inconsequential as the methods of the present invention will iterate over every row in the full replica. Processing then continues to decision block 1902.

Decision block 1902 operates to determine if the previous version of the selected row is already at the partial replica. This would mean that the selected row is one that was copied to the partial replica but has been recently updated at the full replica. If the previous version of the selected row is at the partial replica then the selected row should be copied to the partial replica, or in other words, the change to the full replica should be propagated to the partial replica. In this event, processing proceeds to element 1904 and FIG. 20 as described below. If a previous version of the selected row is not already at the partial replica then processing continues to decision block 1906.

Decision block 1906 operates to determine if there is a partial replica filter specified for the table to which the selected row belongs. As described above, there are three types of filters; all-rows, boolean, and relationship, and if any of those filters apply to the table to which the selected row belongs, then decision block 1906 evaluates to TRUE and processing continues to decision block 1908. If decision block 1906 does not evaluate to TRUE then processing returns to step 1900 to select the next recently changed row.

Decision block 1908 operates to determine if an all-rows filter applies to the table to which the selected row belongs. If yes, then the selected row has been added to the database since the population, or last synchronization, of the partial replica and, due to the all-rows filter, the selected row should be added to the partial replica. Processing then proceeds to step 1904 and FIG. 20 as described below. If there is not an all-rows filter specified for the table to which the selected row belongs then processing continues to decision block 1910.

Decision block 1910 operates to determine if there is a relationship filter specified for the table to which the selected row belongs. If there is a relationship filter specified for the table to which the selected row belongs, then processing continues to element 1904 and FIG. 20, as described below. If there is no relationship filter specified for the relevant table, then processing continues to decision block 1912.

Since, by the operation of decision block 1906, it is known that a filter of some type applies to the selected table and the filter is neither an all-rows or a relationship table, a boolean filter applies to the selected table. Decision block 1912 determines if the boolean expression for the selected table evaluates to TRUE for the selected row. If the boolean expression evaluates to TRUE then the row should be copied to the partial replica and processing continues to element 1904 and FIG. 20, as described below. If the boolean expression does not evaluate to TRUE then processing returns to step 1900 for the selection of the next recently-changed row.

In each case of a selected row representing an update to the full replica which should be propagated to the partial replica, processing continues to FIG. 20 and decision block 1914. The determination made in the steps of FIG. 19 that a selected row of the full replica should be propagated to the partial replica is made without knowledge of whether the selected row can or cannot be immediately propagated to the partial replica. Decision block 1914 operates to determine if the partial replica contains rows containing the necessary primary keys such that the selected row can be copied to the partial replica. If the selected row can be copied to the partial replica at this point then processing continues to step 1916 otherwise processing continues to step 1918.

Step 1918 operates to copy a table identifier and a row identifier, an identifier pair, to a temporary table. As was described with respect to the methods of the present invention for populating the partial replica, a temporary table is used to store identifier pairs for rows which belong at the partial replica but can not be immediately copied to the partial replica because the rows with the corresponding primary keys are not yet part of the partial replica tables. Processing then proceeds to decision block 1920 where decision block 1920 operates to determine if there are any unprocessed, recently updated rows at the full replica. If there are unprocessed, recently updated rows at the full replica, then processing continues to element 1922 and FIG. 20 where the next recently updated row is selected for processing. If there are no unprocessed, recently updated rows at the full replica, then processing continues to element 1924 and FIG. 21, as described below.

If it was determined in decision block 1914 that the selected row can be copied to the partial replica then, in step 1916, the update of the selected row is propagated to the appropriate partial replica table. Processing then continues to decision block 1926.

Steps 1926–1932 operate to identify any rows related to the row just copied (the "copied row") to the partial replica by the operation of step 1916. Decision block 1926 determines if the copied row contains a foreign key. If the copied row contains one, or more, foreign key(s) then processing continues to step 1928 where the identifier pair(s) for the rows containing the corresponding primary key(s) (the "related row(s)") are copied to the temporary table. If the copied row does not contain any foreign keys then processing continues to decision block 1930.

Decision block 1930 operates to determine if the primary key of the copied row is referenced by a relationship filter. If the primary key of the copied row is referenced by a relationship filter then processing proceeds to step 1932 where the identifier pair(s) for the corresponding related rows are copied to the temporary table. Processing then proceeds to decision block 1920. If the primary key of the copied row is not referenced by a relationship filter then processing proceeds from decision block 1930 to decision block 1920.

As described above, if there are further unprocessed recently changed rows at the full replica then processing returns from decision block 1920 to FIG. 19 where the next unprocessed, recently changed row is selected at step 1900.

If there are no more unprocessed recently changed rows at the full replica, then processing proceeds to step 1934 and FIG. 21.

FIG. 21 illustrates the method of processing the temporary table after all recently changed rows of the full replica have been processed as described above. As was noted above, propagation of some of the updates to the partial replica will have already occurred prior to the steps of FIG. 21 while others will have resulted in identifier pairs for the relevant, and related rows being stored in the temporary table. The steps of FIG. 21 operate to process the rows identified by the identifier pairs of the temporary table.

Decision block 1934 determines if there are additional identifier pairs in the temporary table. If there are additional identifier pairs in the temporary table then processing continues to step 1936 else processing continues to step 1938 as described below.

Step 1936 operates to read the next identifier pair of the temporary table and select the row of the full replica identified by the identifier pair. Processing then continues to decision block 1940. Decision block 1940 operates to determine if the partial replica contains row(s) containing the necessary primary key(s) such that the selected related row can be copied to the partial replica while maintaining the referential integrity of the partial replica. If the row cannot be copied to the partial replica at this point then processing returns to decision block 1934 to begin the process of selecting the next identifier pair in the temporary table. If the selected row can be copied to the partial replica at this point then processing continues to step 1942 where the selected row is copied to the partial replica. Processing then proceeds to step 1944.

Step 1944 operates to delete the identifier pair for the just-copied row from the temporary table. In this way, the number of rows of identifier pairs in the temporary table is reduced each time one of the identified rows is copied to the partial replica. As discussed before, each time a row is copied to the partial replica, it must be determined if there are any other rows related to the copied row which also belong at the partial replica. Therefore the logic of steps 1926–1932 of FIG. 20 is repeated for each row copied to the partial replica as a result of its identifier pair being processed by steps 1934–1944. This iterative process continues until, at decision block 1934 of FIG. 21, it is determined that there are no more identifier pairs remaining in the temporary table or that no progress is made when iterating over the remaining identifier pairs. In both cases processing continues to step 1938.

Step 1938 operates to generate an error log for the just-concluded synchronization. In the case where no more identifier pairs remain in the temporary table, there are no synchronization errors and this fact is reflected in the error log. In the case where there are remaining identifier pairs in the temporary table but no progress is made in removing them from the temporary table when the methods of the present invention operate to iterate over the temporary table, an error log is generated to indicate which rows of the full replica will require human intervention in propagating the relevant updates to the partial replica.

SUMMARY

The partial replica system of the present invention includes a method and apparatus for efficiently generating and synchronizing partial replicas that contain only the data requested by the user and all related data thereby maintaining the referential integrity of the database. Although specific embodiments are disclosed herein, it is expected that persons skilled in the art can and will design alternative header generation systems that are within the scope of the following claims either literally or under the Doctrine of Equivalents.

I claim:

1. A method of populating a partial replica database from an original database having multiple original record sources each of said original record sources having records wherein certain predetermined relationships apply to said original record sources said predetermined relationships linking a foreign key of a first of said original record sources to a primary key of a second of said original record sources, comprising the steps of:

retrieving a filter associated with said replica database from a memory wherein said filter specifies certain conditions to be applied to said original database for the selection of records for the population of said replica database;

selecting records from said original database wherein said selected records satisfy said conditions specified by said filter;

populating said replica database with said selected records to create a populated replica database, wherein said predetermined relationships of said original database are enforced in said populated replica database.

2. A method according to claim 1 wherein said selecting step includes:

selecting a first record from said first original record source wherein said first record contains a value in a field of said first record satisfying said filter wherein said filter is a boolean filter and said first record contains said foreign key; and selecting a second record from said second original record source wherein said second record contains said primary key, said primary key is linked by one of said predetermined relationships to said foreign key of said first record.

3. A method according to claim 2 wherein said populating step includes:

copying said first record from said first original record source to a first replica record source wherein said first replica record source corresponds to said first original record source and is part of said replica database; and copying said second record from said second original record source to a second replica record source wherein said second replica record source corresponds to said second original record source and is part of said replica database.

4. A method according to claim 2 wherein said step of selecting said second record includes:

determining whether said primary key of said first record is specified by a relationship filter, wherein said relationship filter identifies a predetermined relationship between said primary key of said first original record source and said foreign key of said second original record source; and selecting said second record from said second original record source wherein said second record contains a foreign key corresponding to said primary key of said first record.

5. A method according to claim 4 wherein said populating step includes:

copying said first record from said first original record source to a first replica record source wherein said first replica record source corresponds to said first original record source and is part of said replica database; and copying said second record from said second original record source to a second replica record source wherein said second replica record source corresponds to said second original record source and is part of said replica database.

6. A method according to claim 1 wherein said selecting step includes:

selecting a first record from said first original record source wherein said first record is within said first original record source, said first original record source is specified by said filter and said filter is an all-rows filter;

selecting a second record from said second original record source wherein said second record contains said primary key, said primary key is linked by one of said predetermined relationships to said foreign key of said first record.

7. A method according to claim 6 wherein said populating step includes:

copying said first record from said first original record source to a first replica record source wherein said first replica record source corresponds to said first original record source and is part of said replica database; and copying said second record from said second original record source to a second replica record source wherein said second replica record source corresponds to said second original record source and is part of said replica database.

8. A method according to claim 6 wherein said step of selecting said second record includes:

determining whether said primary key of said first record is specified by a relationship filter, wherein said relationship filter identifies a predetermined relationship between said primary key of said first original record source and said foreign key of said second original record source; and selecting said second record from said second original record source wherein said second record contains a foreign key corresponding to said primary key of said first record.

9. A method according to claim 8 wherein said populating step includes:

copying said first record from said first original record source to a first replica record source wherein said first replica record source corresponds to said first original record source and is part of said replica database; and copying said second record from said second original record source to a second replica record source wherein said second replica record source corresponds to said second original record source and is part of said replica database.

10. A method according to claim 1 wherein said retrieving step includes:

retrieving said filter from said memory wherein said filter specifies records in said original database that have been changed since a most recent synchronization between said partial database and said original database.

11. A method of populating a replica database with a record selected from an original database having an original record source containing more than one record, said method comprising the steps of:

defining a filter having a condition in terms of a field within said original record source;

storing said filter in a memory;

receiving a replication signal indicating the need to populate said replica database;

retrieving said filter from said memory in response to said replication signal;

selecting said record from said more than one records wherein said selected record contains a value in said field satisfying said condition specified by said filter; and copying said selected record from said original record source to a replica record source wherein said replica record source corresponds to said original record source and is part of said replica database.

12. A method according to claim 11 wherein said filter is selected from the group consisting of: boolean filters, and all-rows filters.

13. A method according to claim 12 wherein said selecting step includes:

selecting a first record from a first original record source wherein said first record contains a value in said field satisfying said condition specified by said filter; and selecting a second record from a second original record source wherein said second record is related to said first record.

14. A method according to claim 13 wherein said copying step includes:

copying said first record from said first original record source to a first replica record source wherein said first replica record source corresponds to said first original record source and is part of said replica database; and copying said second record from said second original record source to a second replica record source wherein said second replica record source corresponds to said second original record source and is part of said replica database.

15. A method according to claim 13 wherein said step of selecting said second record includes;

selecting said second record wherein said first record contains a foreign key corresponding to a primary key of said second record.

16. A method according to claim 13 wherein said step of selecting said second record includes:

determining whether a primary key of said first record is specified by a relationship filter, wherein said relationship filter identifies a predetermined relationship between said primary key of said first original record source and a foreign key of said second original record source; and selecting a second record from said second original record source wherein said second record contains a foreign key corresponding to said primary key of said first record.

17. A computer-readable medium having computer-executable instructions for populating a partial replica database from an original database having multiple original record sources each of said original record sources having records wherein certain predetermined relationships apply to said original record sources said predetermined relationships linking a foreign key of a first of said original record sources to a primary key of a second of said original record sources, said method steps comprising:

retrieving a filter associated with said replica database from a memory wherein said filter specifies certain conditions to be applied to said original database for the selection of records for the population of said replica database;

selecting records from said original database wherein said selected records satisfy said conditions specified by said filter; and populating said replica database with said selected records to create a populated replica database, wherein said predetermined relationships of said original database are enforced in said populated replica database.

18. The computer-readable medium of claim 17 wherein said selecting step includes:

selecting a first record from said first original record source wherein said first record contains a value in a field of said first record satisfying said filter wherein said filter is a boolean filter and said first record contains a foreign key; and selecting a second record from said second original record source wherein said second record contains said primary key, said primary key is linked by one of said predetermined relationships to said foreign key of said first record.

19. The computer-readable medium of claim 18 wherein said populating step includes:

copying said first record from said first original record source to a first replica record source wherein said first replica record source corresponds to said first original record source and is part of said replica database; and copying said second record from said second original record source to a second replica record source wherein said second replica record source corresponds to said second original record source and is part of said replica database.

20. The computer-readable medium of claim 18 wherein said step of selecting said second record includes:

determining whether said primary key of said first record is specified by a relationship filter, wherein said relationship filter identifies a predetermined relationship between said primary key of said first original record source and said foreign key of said second original record source; and selecting said second record from said second original record source wherein said second record contains a foreign key corresponding to said primary key of said first record.

21. The computer-readable medium of claim 20 wherein said populating step includes:

copying said first record from said first original record source to a first replica record source wherein said first replica record source corresponds to said first original record source and is part of said replica database; and copying said second record from said second original record source to a second replica record source wherein said second replica record source corresponds to said second original record source and is part of said replica database.

22. The computer-readable medium of claim 17 wherein said selecting step includes:

selecting a first record from said first original record source wherein said first record is within said first original record source, said first original record source is specified by said filter and said filter is an all-rows filter;

selecting a second record from said second original record source wherein said second record contains said primary key, said primary key is linked by one of said predetermined relationships to said foreign key of said first record.

23. The computer-readable medium of claim 22 wherein said populating step includes:
- copying said first record from said first original record source to a first replica record source wherein said first replica record source corresponds to said first original record source and is part of said replica database; and
- copying said second record from said second original record source to a second replica record source wherein said second replica record source corresponds to said second original record source and is part of said replica database.

24. The computer-readable medium of claim 20 wherein said step of selecting said second record includes:
- determining whether said primary key of said first record is specified by a relationship filter, wherein said relationship filter identifies a predetermined relationship between said primary key of said first original record source and said foreign key of said second original record source; and
- selecting said second record from said second original record source wherein said second record contains a foreign key corresponding to said primary key of said first record.

25. The computer-readable medium of claim 24 wherein said populating step includes:
- copying said first record from said first original record source to a first replica record source wherein said first replica record source corresponds to said first original record source and is part of said replica database; and
- copying said second record from said second original record source to a second replica record source wherein said second replica record source corresponds to said second original record source and is part of said replica database.

26. The computer-readable medium of claim 17 wherein said retrieving step includes:
- retrieving said filter from said memory wherein said filter specifies records in said original database that have been changed since a most recent synchronization between said partial database and said original database.

* * * * *